United States Patent
Esch (10) Patent No.: US 9,834,062 B2
(45) Date of Patent: Dec. 5, 2017

(54) METHOD FOR MAINTAINING A VEHICLE AIR CONDITIONING UNIT AND SERVICE APPARATUS THEREFOR

(75) Inventor: Franz-Josef Esch, Horstel (DE)

(73) Assignee: Dometic Sweden AB, Solna (SE)

( * ) Notice: Subject to any disclaimer, the term of this patent is extended or adjusted under 35 U.S.C. 154(b) by 1029 days.

(21) Appl. No.: 13/511,270

(22) PCT Filed: Nov. 25, 2010

(86) PCT No.: PCT/EP2010/007155
§ 371 (c)(1),
(2), (4) Date: Jun. 19, 2012

(87) PCT Pub. No.: WO2011/063961
PCT Pub. Date: Jun. 3, 2011

(65) Prior Publication Data
US 2012/0247131 A1    Oct. 4, 2012

(30) Foreign Application Priority Data
Nov. 25, 2009  (DE) .................. 10 2009 054 436

(51) Int. Cl.
*F25B 45/00*    (2006.01)
*B60H 1/00*    (2006.01)

(52) U.S. Cl.
CPC ......... *B60H 1/00585* (2013.01); *F25B 45/00* (2013.01); *F25B 2400/23* (2013.01)

(58) Field of Classification Search
CPC ...... B60H 1/00585; F25B 43/02; F25B 45/00; F25B 2345/00–2345/007
See application file for complete search history.

(56) References Cited

U.S. PATENT DOCUMENTS 2,601,904 A * 7/1952 Erwin ............................. 95/249
4,538,964 A    9/1985 Brown
(Continued)

FOREIGN PATENT DOCUMENTS

DE         4319051    12/1994
DE    202008003123     7/2009
(Continued)

OTHER PUBLICATIONS

European Patent Office, International Search Report and Written Opinion for PCT/EP2010/007155 dated Jun. 7, 2012, pp. 1-7, Munchen, Germany.
(Continued)

*Primary Examiner* — Christopher R Zerphey
(74) *Attorney, Agent, or Firm* — Middleton Reutlinger (57) ABSTRACT

A method for servicing a vehicle air-conditioning system operated with a closed coolant circulation system, in which in a first servicing phase, a circulation mixture of refrigerant, compressor oil and, if appropriate, further mixture components is sucked out from a vehicle air-conditioning system into a separator stage by means of a compressor via a separator and in the process refrigerant is separated from the sucked-out circulation mixture by means of the separator, compressed and collected, and its quantity is determined. In a second servicing phase, the refrigerant circulation system of the vehicle air-conditioning system is largely emptied of residual content by means of a vacuum pump. The residual gases which are pumped out in the second servicing phase are conducted through the separator stage by means of the compressor, and the quantity of residual refrigerant collected in the process is determined.

19 Claims, 2 Drawing Sheets

(56) References Cited

U.S. PATENT DOCUMENTS

| | | | |
|---|---|---|---|
| 4,998,413 A | 3/1991 | Sato et al. | |
| 5,024,061 A | 6/1991 | Pfeil, Jr. et al. | |
| 5,172,562 A * | 12/1992 | Manz et al. | 62/149 |
| 5,353,603 A | 10/1994 | Outlaw et al. | |
| 5,371,019 A | 12/1994 | Manz et al. | |
| 5,471,848 A | 12/1995 | Major et al. | |
| 5,517,825 A | 5/1996 | Manz et al. | |
| 5,535,596 A * | 7/1996 | Todack | F25B 45/00 62/149 |
| 5,582,023 A * | 12/1996 | O'Neal | 62/195 |
| 6,314,749 B1 | 11/2001 | Van Steenburgh, Jr. | |
| 6,408,637 B1 | 6/2002 | Hanson et al. | |
| 6,779,350 B2 | 8/2004 | Ramachandran et al. | |
| 8,079,226 B2 | 12/2011 | Brown et al. | |
| 8,272,228 B2 | 9/2012 | Murray et al. | |
| 2003/0188545 A1* | 10/2003 | Ramachandran et al. | 62/292 |
| 2006/0130510 A1 | 6/2006 | Murray et al. | |
| 2007/0113575 A1* | 5/2007 | Borre | F16K 11/0873 62/292 |
| 2008/0276634 A1 | 11/2008 | Brown et al. | |
| 2009/0158756 A1 | 6/2009 | Brown et al. | |
| 2009/0241560 A1 | 10/2009 | Murray et al. | |
| 2013/0205811 A1 | 8/2013 | Esch | |
| 2014/0033742 A1 | 2/2014 | Esch | |
| 2014/0223928 A1 | 8/2014 | Esch | |

FOREIGN PATENT DOCUMENTS

| | | |
|---|---|---|
| DE | 202008003122 | 9/2009 |
| DE | 102009054436 | 5/2011 |
| DE | 102010049615 | 5/2011 |
| WO | 8912792 | 12/1989 |
| WO | 2007085480 | 8/2007 |
| WO | WO 2007/085480 | 8/2007 |
| WO | 2011066833 | 6/2011 |
| WO | 2011088831 | 7/2011 |
| WO | WO 2011088831 A1 * | 7/2011 |

OTHER PUBLICATIONS

Transmittal Letter of Related Cases Dec. 8, 2016.

European Patent Office, International Search Report and Written Opinion for PCT/EP2011/004621,. pp. 1-7, Munchen, Germany Mar. 28, 2013.

European Patent Office, International Search Report and Written Opinion for PCT/EP2012/002197,. pp. 1-6, Rijswijk, Netherlands Dec. 5, 2013.

European Patent Office, International Search Report and Written Opinion for PCT/EP2012/000753,. pp. 1-4, Munchen, Germany Aug. 29, 2013.

* cited by examiner

Fig. 1

(PRIOR ART)

Fig. 2

METHOD FOR MAINTAINING A VEHICLE AIR CONDITIONING UNIT AND SERVICE APPARATUS THEREFOR

The invention relates to a method for servicing a vehicle air-conditioning system with a closed refrigerant circulation system and to a servicing device for same.

BACKGROUND OF THE INVENTION

The invention relates to a method for servicing a vehicle air-conditioning system with a closed refrigerant circulation system according to the preamble of claim 1 and to a servicing device for same according to the preamble of claim 10. Accordingly, a vehicle air-conditioning system is serviced in two phases. In a first phase, the circulation mixture of refrigerant, compressor oil and, if appropriate, further mixture components is sucked out of the refrigerant circulation system of the vehicle air-conditioning system into a separator stage by means of a refrigerant compressor via a separator. In this context, refrigerant is separated from the sucked-out circulation mixture by means of the separator, compressed and collected, and its quantity is determined. In a second servicing phase, the refrigerant circulation system of the vehicle air-conditioning system is largely emptied of residual content by means of a vacuum pump. A corresponding servicing device for vehicle air-conditioning systems is provided with an emptying device and a filling device for sucking out the refrigerant/compressor oil mixture from the refrigerant circulation system of a vehicle air-conditioning system and for refilling the vehicle air-conditioning system with refrigerant and compressor oil. A separation stage comprises at least one oil separator, a refrigerant compressor and a refrigerant weighing device. Furthermore, a vacuum pump for largely emptying the refrigerant circulation system of residual content is provided.

TECHNICAL BACKGROUND

Servicing devices for vehicle air-conditioning systems serve, inter alia, to empty from time to time, within the scope of servicing, the refrigerant circuit of very different vehicle air-conditioning systems and to fill up said circuit again with new refrigerant. In the process, it is necessary to comply with precise quantities and refrigerant specifications. Furthermore, in many cases, lubricating oil for the compressor of the refrigerant circuit of the vehicle air-conditioning system has to be removed and filled up again. This also takes place in quantities and specifications which are dependent on the type of vehicle or type of air-conditioning device. Many vehicle air-conditioning systems also require an additive for the refrigerant circulation, which additive is also partially replaced during servicing. The compressor oil usually passes into the refrigerant circuit and is therefore also pumped round during operation of the vehicle air-conditioning systems. Only quite specific pairing of refrigerant and compressor oil are compatible with one another for this purpose. In order to be able to recover at least some of the refrigerant for re-use after the sucking out of the refrigerant/compressor oil mixture, servicing devices for vehicle air-conditioning systems usually also have a separator with which refrigerant can be separated from the refrigerant/compressor oil mixture for re-use. Used compressor oil and, if appropriate, used additive are/is generally collected by the servicing device in order to be discarded later.

Figure 1:
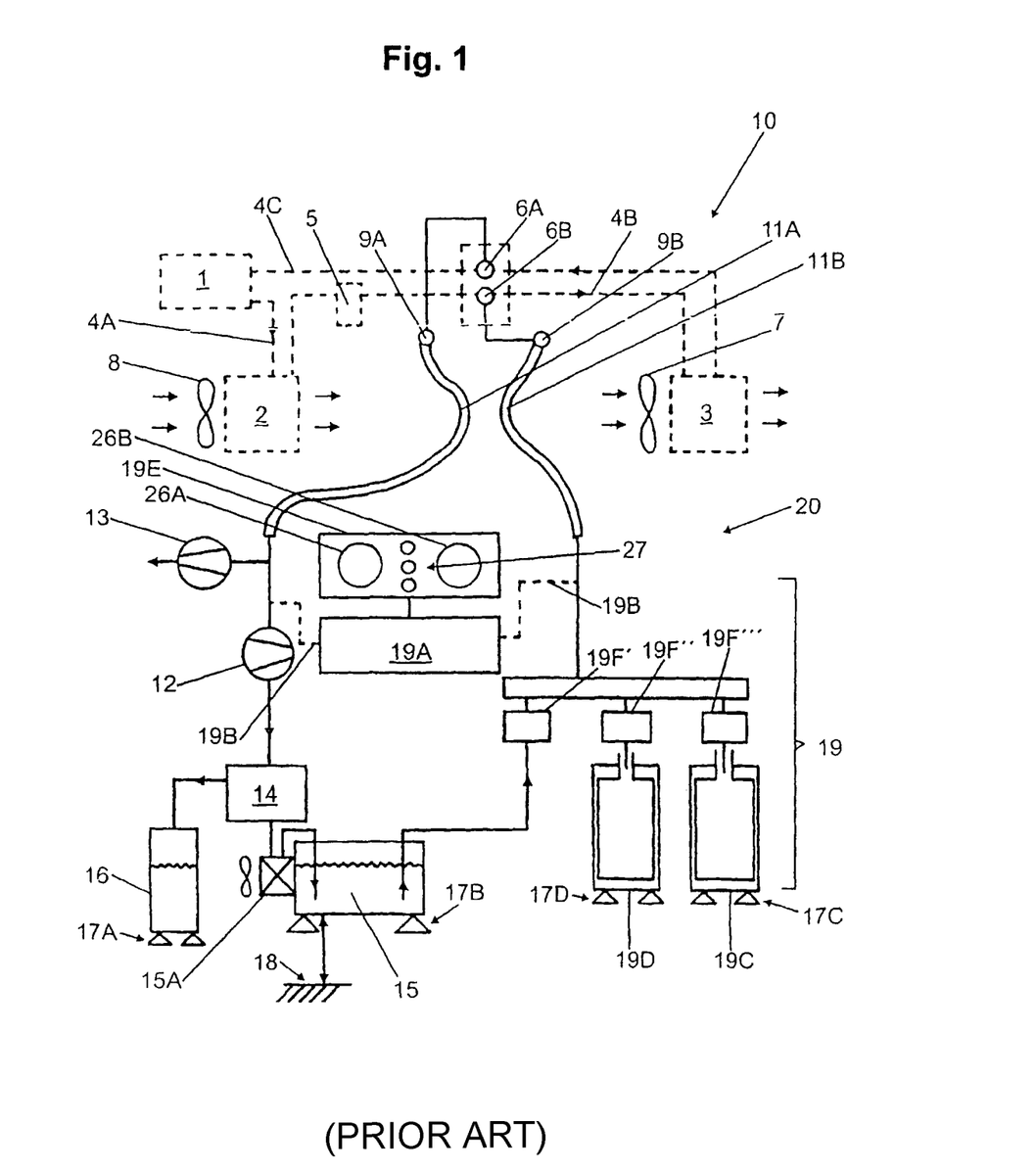
FIG. 1 shows a prior art servicing device as a block diagram.

WO 2007/085480 by the applicant discloses a servicing device for vehicle air-conditioning systems according to the block diagram and FIG. 1. The latter shows in a continuous line the most important components of the generic servicing device for a vehicle air-conditioning system, and in dashed lines a vehicle air-conditioning system to be serviced. The latter is composed of a compressor 1 with oil lubrication, a condenser 2, a vaporizer 3 and, between these components, pipelines 4A-4C which produce a closed coolant system. In addition, a dryer 5 is provided which can also serve as a collector or reservoir for refrigerant. Finally, two servicing ports 6a/6b for the exchange of fluid are installed in the refrigerant circuit. The cold which is available at the vaporizer 3 is discharged by a cold air blower 7 and fed to the passenger compartment of the vehicle. The condensation heat of the condenser 2 is transported away by a warm air blower 8. The servicing connectors 9A and 9B make it possible, in the case of servicing, to extract and/or fill in refrigerant/compressor oil mixture at the servicing ports 6A, 6B. The vehicle air-conditioning system which is denoted in its entirety by 10 differs from one type of vehicle to another and is not a subject matter of the present invention.

A servicing device, denoted in its entirety by 20, for a vehicle air-conditioning system has flexible pressure hoses 11A, 11B for connecting the servicing device 20 to the vehicle air-conditioning system 10 via the servicing connectors 9A, 9B at the servicing ports 6A, 6B. A discharge pump 12, which is embodied as a refrigerant compressor, feeds used refrigerant/compressor oil mixture via the pressure hoses 11A and 11B and the separator 14. The latter separates refrigerant from the sucked-out mixture by vaporization, and feeds said refrigerant to a refrigerant reservoir 15 embodied as a pressurized container. Compressor oil/additive mixture which is precipitated in the separator 14 is connected in a replaceable used oil container 16 and its weight is determined by means of a weighing device 17A. An air-cooled refrigerant condenser 15A is permanently connected to the refrigerant reservoir 15. Fed-back refrigerant is therefore fed, mainly in liquid form, to the refrigerant reservoir 15. The entire refrigerant reservoir together with the condenser rests on a further weighing device 17B for weighing the refrigerant which is fed in and discharged and refrigerant in the reservoir. A vacuum pump 13 ensures, after the sucking out of the used mixture, that the partial vacuum necessary for refilling is present in the circuit of the vehicle air-conditioning system, and discharges the sucked-out gas volume to the atmosphere.

A refilling system, denoted in its entirety by 19, is composed essentially of replaceable reservoir containers 19D for compressor oil and 19C for additives, a control unit 19A with a valve block and control lines 19B, a remote display 19E and metering and valve units 19F' to 19F'''. The reservoir containers 19C and 19D can preferably be weighed. Further weighing devices 17C, 17D are used for this.

DE 20 2008 003 123 U1 discloses a further servicing device for vehicle air-conditioning systems of the applicant, in which the refillability of the previously evacuated vehicle air-conditioning system is improved by a heat source which is provided in the refrigerant reservoir container and with the purpose of increasing the pressure of the refrigerant. A comparable servicing device for vehicle air-conditioning systems is known from US 2009/0158756 A1.

In addition, US 2009/0241560 A1 discloses a servicing device for vehicle air-conditioning systems which is not the generic type and in which, although refrigerant/compressor oil mixture flowing out of the vehicle air-conditioning system is conducted via a separator and the refrigerant is re-used after compression and the vehicle air-conditioning system is emptied of residual content by means of a vacuum pump, the use of the residual emptying gas quantity is not described, nor are the diagnostic means for the state of the vehicle air-conditioning system.

SUMMARY OF THE INVENTION

Taking the above as a starting point, the invention is based on the object of detecting as precisely as possible the initially present quantities of refrigerant in the refrigerant circulation systems of the vehicle air-conditioning system when servicing vehicle air-conditioning systems, in order to improve the diagnosis of the state of the vehicle air-conditioning system. In order to achieve this object, a method and a servicing device are proposed. Accordingly, there is provision with respect to a servicing method that the residual gases pumped out in the second servicing phase with the vacuum pump are conducted through the separator stage by means of the refrigerant compressor, and the quantity of residual refrigerant collected in the process is also determined. With respect to a servicing device of the generic type, at least one pressurized and/or timed switchover valve block is provided in such a way that the refrigerant circulation system of the vehicle air-conditioning system is optionally directed connected fluidly to the separator stage and that the flow connection from the refrigerant circulation system to the separator stage is optionally divertly via the vacuum pump.

The invention considerably improves the possibility of diagnosing the state of the vehicle air-conditioning system in the course of the occasional exchange of the refrigerant/compressor oil mixture. It is therefore possible, on the one hand, to determine whether the refrigerant loss which the closed refrigerant circulation system of the vehicle air-conditioning system has suffered since the last service has remained within the legal limits, for example below 40 gr or 60 gr. It is therefore possible to monitor compliance with legal limits.

If refrigerant losses which go beyond the natural refrigerant leakage quantities, which are almost unavoidable for structural reasons in vehicle air-conditioning systems, this may be due, inter alia, to leakage due to impacts by stones, material wear or component defects. In the past, no particular attention has been paid to this criterion. The emphasis was on recovering part of the refrigerant occurring due to expansion when the vehicle air-conditioning system is emptied, in order therefore to reduce costs to a certain extent. Conclusions about the state or type and extent of defects in the vehicle air-conditioning system, and in particular in the refrigerant circulation system, were possible only in a general way, in particular because the expansion behavior of the refrigerant/compressor oil mixture during the servicing of vehicle air-conditioning systems of different design or with different installation states can only be compared with one another with difficulty. By virtue of the invention, such partial quantities of refrigerant, which were not taken into account in the past, are also measured during the servicing of the vehicle air-conditioning system. The inventive combination of the emptying of the residual quantity from the coolant circulation system by means of a vacuum pump with subsequent further processing of the residual gases in the separator stage now provides greater insight into the state of the vehicle air-conditioning system. The invention also makes a contribution to environmental protection and/or to equipment safety and working safety because a servicing system which is closed with respect to the refrigerant is produced, with the result that environmentally damaging refrigerant or such refrigerant which is at risk of explosion or fire can be safely discharged.

The possibilities of use of the invention are, however, not restricted to standard servicing work on vehicle air-conditioning systems but rather also permit improvements in the case of repair work. If relatively large discrepancies in the quantities of refrigerant were found in the past in known servicing devices for vehicle air-conditioning systems, this automatically triggered extensive and laborious operations for searching for leaks which, as it were, were necessary purely through suspicion. Because of the large differences between various vehicle air-conditioning systems for structural reasons and the only low level of diagnostic accuracy, in the past it was necessary to search for leaks even when, as has been detected by the invention, up to then there were actually not leaks present but instead it was merely the case that the self-emptying of the refrigerant circulation system of the vehicle air-conditioning system which was due to expansion was simply inadequate.

In order to improve the diagnostic accuracy even further, it is proposed to temporarily fluidically connect a container which is connected downstream of the separator, for liquid components separated from the circulation mixture, such as compressor oil, to the suction side of the vacuum pump, and to feed non-condensed gas volumes occurring in this container to the separator stage again. In this way, residual quantities of refrigerant which are discharged together with the used compressor oil from the separator and residual quantities of refrigerant which are still dissolved to a certain extent in the compressor oil can also be detected. The switchover can be triggered, inter alia, by pressure occurring in the container.

In order to be able to remove from the separator stage non-condensed and non-condensable components of the residual gases drawn out of the refrigerant circulation system of the vehicle air-conditioning system by the vacuum pump, it is possible to provide for the weighable reservoir container for separated refrigerant to be selectively vented.

In such a reservoir container, the separated off refrigerant is generally in liquefied form and the non-condensed gases above the refrigerant liquid level under the prevailing pressure conditions and temperature conditions may also contain small residual quantities of refrigerant. It is generally inconceivable to reduce the gas pressure in the reservoir container in a clocked and/or pressure-controlled fashion. If, on the other hand, appreciable residual quantities of refrigerant occur in the gas phase in the reservoir container owing to the prevailing pressure conditions and temperature conditions, it is possible to conduct said residual quantities through the separator stage again via the vacuum pump or by virtue of the internal pressure. The largest component of the non-condensable gases in the reservoir container is generally air which, for example in the case of leaks in the vehicle air-conditioning system, may be enclosed in the refrigerant circulation system and said air is released during servicing.

If the servicing device is used for refilling a previously repaired vehicle air-conditioning system, the circulation system of the vehicle air-conditioning system generally contains only air in this state. In this case, the pressure side of the vacuum pump can be connected past the separator stage, for example to the atmosphere.

In the first servicing phase, the system pressure of the refrigerant circulation system of the vehicle air-conditioning system is generally above 1 bar absolute, with the result that the refrigerant compressor of the separator stage has gaseous refrigerant fed to it without a significant suction power. Customary refrigerant compressors are, however, also able to generate a certain suction pressure. It has proven advantageous to generate, by means of the refrigerant compressor of the separator stage, a modest partial vacuum of the order of magnitude of approximately 0.7 bar absolute in the refrigerant circulation system of the vehicle air-conditioning system or the outputs thereof and only subsequently to switch over to the second servicing phase in which the emptying of the residual content of the refrigerant circulation system of the vehicle air-conditioning system is carried out by means of a vacuum pump, wherein a pressure of the order of magnitude of approximately 1 mbar absolute is aimed at. If the refrigerant compressor is not able to generate a certain partial vacuum, but instead the pressure on its input side remains at approximately 1 bar or ambient pressure, this is a sign of a system leak, as a result of which only air is being sucked in. In these cases, the first servicing phase is ended and the compressor is switched off. The same applies correspondingly to the vacuum pump.

The vacuum pump has only moderate overpressures of approximately 2 bar absolute on its pressure side. If the vacuum pump connected fluidically in series with the refrigerant compressor delivers relatively large quantities of gas per time unit, which is the case, in particular, at the start of the emptying of the residual content of the refrigerant circulation system of the vehicle air-conditioning system, the vacuum pump is adjusted to the refrigerant compressor in such a way that the gas pressure between the pressure side of the vacuum pump and the suction side of the refrigerant compressor is measured, and when a defined maximum pressure is reached the vacuum pump is temporarily switched off until the pressure present on the suction side of the compressor has again reached a relatively low, i.e. acceptable, level. The vacuum pump is then switched on again. The typical limiting pressure which leads to the vacuum pump being switched off is 2 bar absolute. A typical pressure for the switching on again of the vacuum pump after preceding pressure-induced switching off may be of the order of magnitude of 0.7 bar absolute.

In order to protect the refrigerant compressor against damage, the refrigerant compressor oil mixture which flows out of the vehicle air-conditioning system in the first servicing phase is firstly heated in order to vaporize the refrigerant and prevent fluid refrigerant still passing into the refrigerant compressor. For this purpose, a heat exchanger is provided. This may use the compression heat of the refrigerant compressor for heating because the gaseous refrigerant which flows to the refrigerant compressor is heated considerably by the compression without condensing.

The exchange of heat between the compressed refrigerant and freshly flowed-out refrigerant can take place in a separate heat exchanger of a known design. A combination of a compressor oil separator and heat exchanger has proven particularly advantageous. For this purpose, the partially still liquid refrigerant flows into a separator container in the interior of which at least one heat exchanger pipe is located, through which pipe the gaseous refrigerant which is compressed, for example at a pressure of up to 19 bar, flows. In this way, the separation of the compressor oil through the action of gravity with simultaneous vaporization of the refrigerant takes place in the same assembly. The heat exchanger is preferably embodied as a double-jacket vessel and has a flow of compressed refrigerant passing though it, in particular after said refrigerant has previously flowed through the heat exchanger in the inner container. This exchange of heat causes the refrigerant pressure in the oil separator to rise—at least if the compressor is switched on, for example briefly. This pressure may be used to discharge used oil into the reservoir container. In this context small quantities of refrigerant can also pass in gaseous form into the used oil container, which quantities are, however, sucked out again by briefly connecting the used oil container to the vacuum pump. The refrigerant is consequently kept in a system which is as good as completely closed.

In accordance with the present invention, there is provided a method for servicing a vehicle air-conditioning system operated with a closed coolant circulation system. The method includes a first servicing phase which includes a circulation mixture of refrigerant, compressor oil and, if appropriate, further mixture components are sucked out from a vehicle air-conditioning system into a separator stage by means of a refrigerant compressor via a separator. The processed refrigerant is separated from the sucked-out circulation mixture by means of the separator, and then compressed and collected, and then its quantity is determined. The method also includes a second servicing phase wherein the refrigerant circulation system of the vehicle air-conditioning system is largely emptied of residual content by means of a vacuum pump. In the second servicing phase, pumped-out residual gases are conducted through the separator stage by means of the refrigerant compressor, and the quantity of residual refrigerant collected in the process is then determined. The method can also include the use of a container which is connected downstream of the separator, for liquid components separated from the circulation mixture. The container can be temporarily fluidly connected to the suction side of the vacuum pump, and non-condensed gas volumes occurring in this container can be fed again to the separator stage. The switching over to the sucked-out operating mode can be triggered by the pressure which comes about in the container connected downstream. The pressure of a weighing container of the separator stage for a separate refrigerant can be monitored, and non-condensable and non-condensed gas can be selectively discharged. Gases that are discharged from the weighing container can be fed again to the separator stage. Gas volumes which are sucked in from the vacuum pump and are refrigerant-free or largely free of refrigerant can be conducted past the separator stage. The separator stage can be bypassed and/or the compressor can be switched off if the vacuum pump and/or the compressor does not reach preset pressures. The switching over from the first servicing phase to the second servicing phase can take place when a preset suction pressure generated by the compressor is reached. The vacuum pump in the second servicing phase can be temporarily switched off as a function of the gas pressure generated on its pressure side, while the compressor of the separator stage continues to run. The present invention is also directed to a servicing device for vehicle air-conditioning systems. The service device has an emptying device and a filling device for sucking out the refrigerant/compressor oil mixture from the refrigerant circulation system of a vehicle air-conditioning system, and for refilling the vehicle air-conditioning system with refrigerant and compressor oil with a separator stage comprising at least one separator, a refrigerant compressor and a refrigerant weighing device, and having a vacuum pump for emptying the refrigerant circulation system of the vehicle air-conditioning system of residual content. The servicing device includes at least one pressure-controlled and/or timed switchover valve block for optionally directly fluidly connecting the refrigerant circulation system to the separator stage and for diverting the flow connection from the refrigerant circulation system of the vehicle air-conditioning system to the separator stage via the vacuum pump. The separator can be configured as a heat exchanger in which compression heat of the compressor supplies evaporation heat for refrigerant which has freshly flowed away. The separator can be configured as a double-jacket heat exchanger, in which compressed refrigerant is conducted through a closed system composed of at least one heat exchanger pipe into an inner container and an outer container of the double-jacket heat exchanger. The at least one switchover valve block can be provided with a pressure sensor, which is connected to a collecting line for refrigerant/compressor oil mixture and has the purpose of changing over the valves from their position in the first servicing phase to their position in the second servicing phase. The at least one switchover valve block can be provided with a pressure switch which is connected to the connecting line between the pressure side of the vacuum pump and the suction side of the compressor and has the purpose of carrying out pressure-controlled switching off and on of the vacuum pump in the second servicing phase.

The above-mentioned components as well as the claimed components and the components which are described in the exemplary embodiments are to be used according to the invention are not subject to any particular exceptional conditions in terms of their size, shaping, selection of materials and technical design, with the result that the selection criteria which are known in the field of application can be applied without restriction.

Further details, features and advantages of the subject matter of the invention can be found in the dependent claims as well as in the subsequent description and the associated drawing in which, by way of example, an exemplary embodiment of a servicing device for vehicle air-conditioning systems is illustrated. Individual features of the claims or of the embodiments can also be combined with other features of other claims and embodiments.

DETAILED DESCRIPTION OF EXEMPLARY EMBODIMENTS

Figure 2:
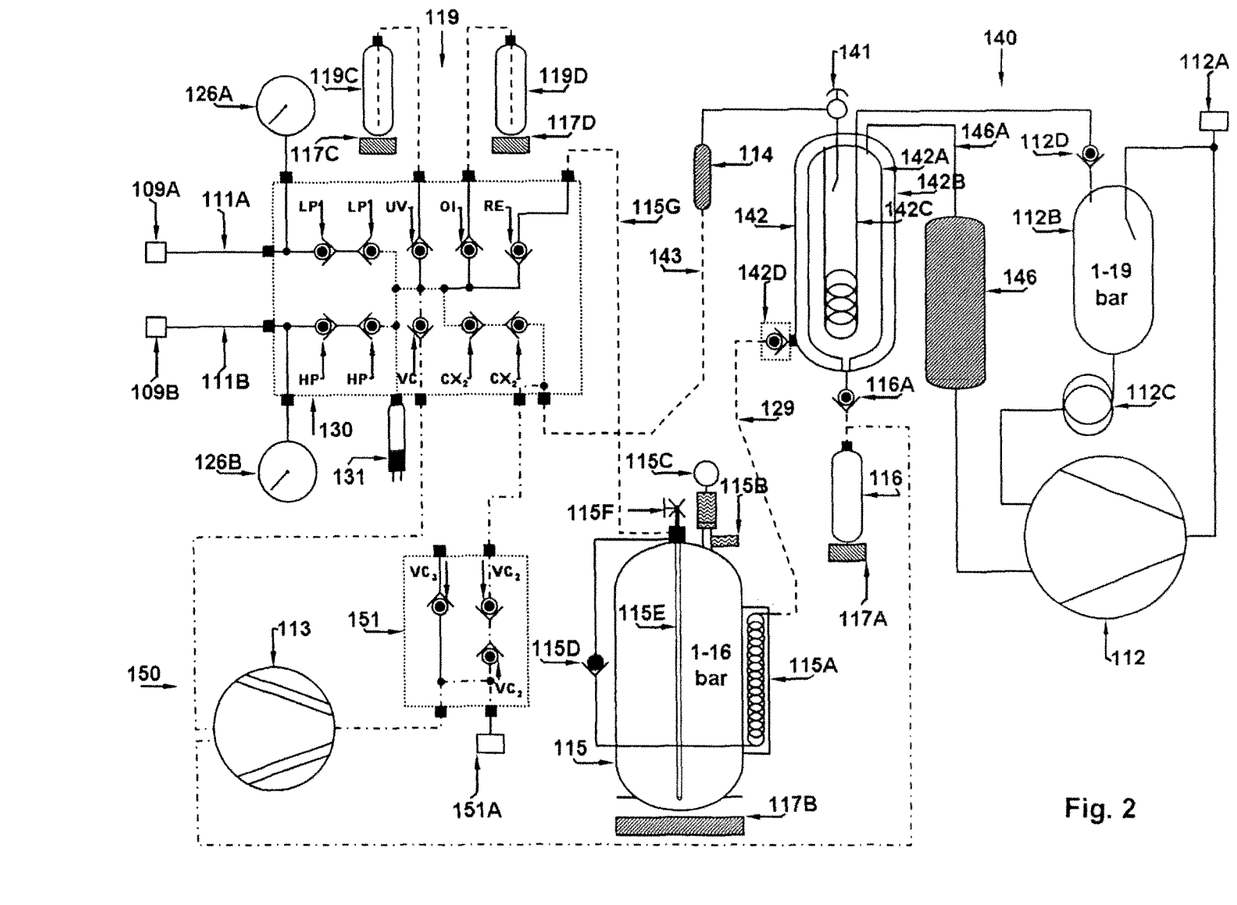
FIG. 2 shows a servicing device for vehicle air-conditioning systems as a block circuit diagram.

The block circuit diagram shows the basic design of a servicing device for vehicle air-conditioning systems. Accordingly, servicing connectors 109A, 109B for connection to the refrigerant/compression circuit of a vehicle air-conditioning system (not illustrated here) are provided in order to service the latter, in particular to empty and refill it. There is a fluidic connection via pressure hoses 111A, 111B to a first switchover valve block 130 whose function is explained further below. The switchover valve block 130 is fluidically connected, on the one hand, to a separator stage 140 which is illustrated on the right in the image and will be explained further below, and on the other hand (bottom left in the diagram) to a vacuum unit 150, which will also be explained further below. A low-pressure manometer 126A and a high-pressure manometer 126B on the switchover valve block 130 serve, inter alia, for checking the state and function of the coolant compressor oil circuit of the vehicle air-conditioning system. Furthermore, the switchover valve block 130 is fluidically connected to a refilling system 119 for compressor oil and additives, with weighing devices 117C and 117D for dispensers 119C, 119D, for example for a leak detection additive or for fresh oil. The system pressure within the switchover valve block 130, which is significant after the start of emptying of the fluid circuit for the system control, which will be explained further below, is monitored by means of a pressure sensor 131 connected to a collecting line of the switchover valve block 130, with the result that the system pressure, in particular the refrigerant pressure of the vehicle air-conditioning system is monitored, with the result that, inter alia, the circulation systems explained below (separator stage 140 and vacuum unit 150 as well as associated valve switching means) can be controlled. Within the switchover valve block 130, the lines which are to be assigned to the circuit of the separator stage 140 are illustrated by dots. In contrast, the lines which are to be assigned to the vacuum unit 160 are illustrated by dot-dash lines, in order to be able to better differentiate the working phases of the system subsequently.

The method of functioning of the separator stage 140 is as follows: after the connection of the servicing connectors 109A, 109B to the corresponding ports of the vehicle air-conditioning system and the opening of the corresponding valves LP, HP, $CX_2$ of the switchover valve block 130, the system pressure of the vehicle air-conditioning system is available in order to transfer a first part of the content of the refrigerant compressor oil circuit of the vehicle air-conditioning system into the separator stage 140. This system pressure is already approximately 3 bar absolute at 0° C., and at approximately 20° C. it is already of an order of magnitude of 6 bar absolute, with the result that the delivery of refrigerant compressor oil mixture into the separator stage 140 firstly even occurs automatically. Moreover, this delivery is promoted by operating the compressor 112, as is explained further below, and is still maintained later when the system pressure drops. The refrigerant compressor oil mixture passes from the switchover valve block 130 via a coarse filter 114 and a constant pressure valve 141 which is set to approximately 3.5 bar absolute into a double-jacket heat exchanger 142, specifically into the inner container 142A thereof. There, the volatile components are vaporized and the gas phase passes via a line 146A into a gas dryer 146 and from there into the compressor 112.

The double-jacket heat exchanger 142 serves simultaneously as a separator for liquid components of the refrigerant compressor oil mixture, here this involves basically the compressor oil, if appropriate additives contained in it and residual quantities of the refrigerant which is still bound in the compressor oil. This liquid phase is fed to a used oil container 116 via an oil discharge valve 116A. The quantities which occur can be recorded by means of a weighing device 117A which also weighs the container.

The compressor 112 ensures that the refrigerant is compressed on its output side to a pressure of up to, for example, 19 bar absolute. A compressor emergency shutoff valve 112A generally limits the pressure to 19 bar. Since the lubrication oil of the compressor also passes into the compressed refrigerant, the latter is separated off in an oil separator 112B and is fed back again to the lubrication means of the compressor 112 via a capillary pipe 112C which acts as a pressure throttle. The compressed, dried refrigerant which is freed of compressor oil and additives passes via a solenoid valve 112D into a heating coil 142C, which is located in the gas space of the inner container 142A of the double-jacket heat exchanger 142. As a result, the compression heat contained in the compressed refrigerant can be output in order to vaporize as far as possible the refrigerant/ compressor oil mixture which is freshly arriving from the vehicle air-conditioning system on the cold side. From the heating coil 142C, the cleaned (recycled) refrigerant firstly passes into the outer jacket region (outer container 142B) of the double-jacket heat exchanger 142 and from there via a valve block 142D and a connecting hose 129 to the refrigerant reservoir 115 (reservoir container). The reservoir container is weighed together with its content by a weighing device 117B. The reservoir container also has a refrigerant condenser 115A, which is advantageously also weighed and in which the refrigerant which is under compression pressure is condensed in order to pass in liquid form into the refrigerant reservoir 115. Both the separator 112B and the refrigerant reservoir 115 are configured as what are referred to as pressurized containers. The pressure in the refrigerant reservoir 115 is protected against overpressure by means of a valve 115B because the gas phase of non-condensable gases, which forms above the liquid level, must be discharged in a controlled fashion starting from a certain overpressure of, for example, 16 bar, for safety reasons. This cannot be carried out automatically by an operator using a handle 115C either.

The liquid refrigerant passes via a non-return valve 115D and a riser pipe 115E into the liquid region of the refrigerant reservoir 115. In order to be able to refill the vehicle air-conditioning system with refrigerant, liquid refrigerant passes via the riser pipe 115E, a valve 115F and a connecting line 115G back into the switchover valve block 130.

As soon as the vehicle air-conditioning system is emptied to such an extent that the compressor 112 can no longer suck in sufficient refrigerant/compressor oil mixture on its low pressure side, which may the case at, for example, a pressure of 0.7 bar absolute, the vacuum unit 150 is operated by actuating the corresponding valves.

Further gas components are therefore sucked in from the fluid circuit of the vehicle air-conditioning system via the collecting line of the switchover valve block 130 by the vacuum pump 113. From the output side of the vacuum pump 113, this gas or gas mixture passes via a (second) switchover valve block 151 and solenoid valves VC2 back to the switchover valve block 130 and from there into the connecting line 143, which fluidically connects the switchover valve block 130 to the separator stage 140. The quantities of gas delivered by the vacuum pump 113 from the vehicle air-conditioning system are then treated in the separator stage 140 in the same way, including the weighing, as occurs at the start of the emptying process to quantities of refrigerant/compressor oil mixture which are sucked in automatically or by the compressor 112 and discharged from the vehicle air-conditioning system. The difference from the first phase, here referred to as an outflow phase, is that owing to the preceding outflow phase which was assisted by the compressor 112, no liquid components, that is to say essentially gaseous refrigerant or, if appropriate, air is sucked out of the vehicle air-conditioning system. In this context, firstly relatively large quantities of gas have to be coped with, while towards the end of the second phase, referred to here as the evacuation phase, the quantities of gas become significantly smaller. At an input pressure of approximately 1 mbar or after expiry of a permanently preset process time the evacuation process is ended.

The gas pressure which is generated by the vacuum pump 113 on its output side should not exceed an order of magnitude of 2 bar absolute in order to avoid damaging the vacuum pump 113. In order to check the pressure, a pressure switch 151A is assigned to the switchover valve block 151 connected downstream of the vacuum pump, with which pressure switch 151A the vacuum pump 113 is switched off when an output pressure of for example 2 bar absolute is exceeded, until the output pressure has correspondingly dropped again so that the vacuum pump 113 can be switched on again.

Since the servicing device is used not only for sucking out and refilling the vehicle air-conditioning system in the normal servicing mode but also for instances of repairs to air-conditioning systems, for example replacement of components, the switchover valve block 151 which is connected downstream of the vacuum pump 113 is equipped with an outlet valve VC3 which can lead, for example, into the atmosphere. Therefore, if only air is sucked out from the repaired vehicle air-conditioning system for subsequent refilling, said air does not pass into the separator stage 140.

LIST OF REFERENCE NUMERALS

| | |
|---|---|
| 1 | Compressor |
| 2 | Vaporizer |
| 3 | Condenser |
| 4A-C | Pipelines |
| 5 | Precipitator |
| 6A/B | Servicing ports |
| 7 | Cold air blower |
| 8 | Warm air blower |
| 9A/B | Servicing connector |
| 10 | Vehicle air-conditioning system |
| 11A/B | Pressure hoses |
| 12 | Suction pump |
| 13 | Vacuum pump |
| 14 | Separator |
| 15 | Refrigerant reservoir |
| 15A | Refrigerant condenser |
| 16 | Used oil container |
| 17A-J | Weighing devices |
| 18 | Relieving device |
| 19 | Refilling system |
| 19A | Control unit with valve block |
| 19B | Control lines |
| 19C | Reservoir container |
| 19D | Reservoir container |
| 19E | Remote display |
| 19F' | Metering and valve unit |
| 19F'' | Metering and valve unit |
| 19F''' | Metering and valve unit |
| 20 | Servicing device |
| 26A | Low pressure manometer |
| 26B | High pressure manometer |
| 119 | Refilling system |
| 109A | Servicing connector |
| 109B | Servicing connector |
| 111A | Pressure hoses |
| 111B | Pressure hoses |
| 112 | Compressor |
| 112A | Compressor emergency shutoff valve |
| 112B | Oil separator |
| 112C | Capillary pipe |
| 112D | Solenoid valve |
| 113 | Vacuum pump |
| 114 | Coarse filter |
| 115 | Refrigerant reservoir |
| 115A | Refrigerant condenser |
| 115B | Valve |
| 115C | Handle |
| 115D | Non-return valve |
| 115E | Riser pipe |
| 115F | Valve |
| 115G | Connecting line |
| 116 | Used oil container |
| 116A | Oil discharge valve |
| 117A | Weighing device |
| 117B | Weighing device |
| 117C | Weighing device |
| 117D | Weighing device |
| 119 | Refilling system |
| 119C | Dispenser |

-continued

LIST OF REFERENCE NUMERALS

| | |
|---|---|
| 119D | Dispenser |
| 126A | Low pressure manometer |
| 126B | High pressure manometer |
| 129 | Connecting hose |
| 130 | First switchover valve block |
| 131 | Pressure sensor |
| 140 | Separator stage |
| 141 | Constant pressure valve |
| 142 | Double-jacket heat exchanger |
| 142A | Inner container |
| 142B | Outer container |
| 142C | Heating coil |
| 142D | Valve block |
| 143 | Connecting line |
| 146 | Gas dryer |
| 146A | Line |
| 150 | Vacuum unit |
| 151 | Second switchover valve |
| 151A | Pressure switch |

The invention claimed is:

1. A method for servicing a vehicle air-conditioning system operated with a closed coolant circulation system comprising the steps of: sucking out in a first servicing phase a circulation mixture comprising at least refrigerant and compressor oil components from the vehicle air-conditioning system into a separator stage by a refrigerant compressor via a separator and separating said refrigerant from the sucked-out circulation mixture by the separator, compressing and collecting said refrigerant, and in which in a second servicing phase that is triggered by at least one of pressure or time, actuating a switchover valve block, emptying the refrigerant circulation system of the vehicle air-conditioning system of residual content, which comprises residual gases, by a vacuum pump, one of time or pressure controlling said switchover valve block having a plurality of valves and disposing said servicing device in fluid communication with a first input pressure side of said vacuum pump and a second output pressure side of said vacuum pump,
wherein
in the second servicing phase, conducting said pumped-out residual gases through the separator stage by the vacuum pump in flow communication with said refrigerant compressor by way of said switchover valve block;
measuring a defined maximum pressure between an output pressure side of said vacuum pump and a suction side of said refrigerant compressor;
temporarily switching off said vacuum pump until a pressure at one of the output side of the vacuum pump or the suction side of the refrigerant compressor reaches an acceptable level; and,
determining the quantity of said refrigerant collected in said first servicing phase and residual refrigerant collected in said second servicing phase.

2. The method as claimed in claim 1, wherein a container which is connected downstream of the separator, for liquid components separated from the circulation mixture, is temporarily fluidly connected to a suction side of the vacuum pump, and gas volumes occurring in the container are fed again to the separator stage.

3. The method as claimed in claim 2, wherein switching over to a sucked-out operating mode is triggered by pressure which comes about in the container connected downstream.

4. The method as claimed in claim 1, wherein monitoring a pressure of a weighing container of the separator stage for separate refrigerant is monitored, and non-condensable and non-condensed gas is selectively discharged from said container.

5. The method as claimed in claim 4, wherein feeding gases discharged from the weighing container again to the separator stage.

6. The method as claimed in claim 1, wherein conducting gas volumes which are sucked in from the vacuum pump and are refrigerant-free or substantially free of refrigerant past the separator stage.

7. The method as claimed in claim 6, wherein the separator stage is bypassed or the compressor is switched off if at least one of the vacuum pump and the compressor does not reach preset pressures.

8. The method as claimed in claim 1, wherein switching over from the first servicing phase to the second servicing phase takes place when a preset suction pressure generated by the compressor is reached.

9. The method as claimed in claim 1, wherein the vacuum pump in the second servicing phase is temporarily switched off as a function of gas pressure generated on a pressure side thereof, while the compressor of the separator stage continues to run.

10. A method for servicing a vehicle air-conditioning system operated with a closed coolant circulation system comprising:
a first servicing phase wherein a circulation fluid that includes one or more components selected from the group consisting of refrigerant and compressor oil comprising the steps of:
sucking out from the vehicle air-conditioning system into a separator stage by a refrigerant compressor via a separator;
separating said refrigerant from sucked-out circulation fluid by said separator,
compressing and collecting said refrigerant;
measuring or weighting to determine a quantity of said collected refrigerant; and,
monitoring a pressure of said container and selectively discharging gas from said container, and feeding condensable gases in said container again to said separator stage;
switching to a second servicing phase upon one of a pressure or time limitation being reached by actuating a switchover valve block and placing said compressor in flow communication with a vacuum pump by way of said switchover valve block, wherein a residual content of said circulation fluid of said vehicle air-conditioning system is—emptied by said vacuum pump, said switchover valve block having a plurality of valves and being disposed in a servicing device in fluid communication with a first input pressure side of said vacuum pump and a second output pressure side of said vacuum pump;
processing in said second servicing phase via said separator;
measuring or weighing to determine a quantity of refrigerant collected in said first servicing phase and said second servicing phase;
measuring a defined maximum pressure between an output pressure side of said vacuum pump and a suction side of said refrigerant compressor; and,
temporarily switching off said vacuum pump until a pressure at one of the output side of the vacuum pump or the suction side of the refrigerant compressor reaches an acceptable level.

11. The method as claimed in claim 10, wherein said circulation fluid that is sucked by said vacuum pump and which is substantially free of refrigerant is conducted past the separator stage.

12. The method as claimed in claim 10, wherein said separator stage is bypassed, said refrigerant compressor is switched off, or combinations thereof if said vacuum pump, said refrigerant compressor, or combinations thereof do not reach preset pressures.

13. The method as claimed in claim 10, wherein said switching from said first servicing phase to said second servicing phase occurs when a preset suction pressure generated by said refrigerant compressor is reached.

14. The method as claimed in claim 13, wherein said switching includes said at least one switchover valve block that has a pressure sensor that is connected to a collecting line for said circulation fluid, said at least one switchover valve block configured to change valve positions to cause switching from said first servicing phase to said second servicing phase.

15. The method as claimed in claim 14, wherein said at least one switchover valve block is provided with a pressure switch that is connected to said collecting line between a pressure side of said vacuum pump and a suction side of said refrigerant compressor, said pressure switch configured to carry out pressure-controlled switching off and on of said vacuum pump in said second servicing phase.

16. The method as claimed in claim 10, wherein said vacuum pump in said second servicing phase is temporarily switched off as a function of a gas pressure generated on a pressure side of said vacuum pump while said refrigerant compressor continues to run.

17. The method as claimed in claim 10, wherein said separator, of said first and second servicing phase is a heat exchanger in which compression heat of said separator supplies evaporation heat for said circulation fluid.

18. The method as claimed in claim 15, wherein said separator of said first and second servicing phase is a double jacket heat exchanger in which compressed refrigerant is conducted through a closed system composed of at least one heat exchanger pipe into an inner container and an outer container of the double-jacket heat exchanger.

19. A method for servicing a vehicle air-conditioning system operated with a closed coolant circulation system comprising:

sucking out a circulation mixture which comprises at least refrigerant and compressor oil components from the vehicle air-conditioning system into a separator stage by a refrigerant compressor via a separator in a first servicing phase;

separating said refrigerant from the sucked-out circulation mixture;

determining a quantity of said refrigerant;

actuating of a switchover valve block by at least one of pressure or time to start a second servicing phase, said switchover valve block having a plurality of valves and being disposed in a servicing device in fluid communication with a first input pressure side of a vacuum pump and a second output pressure side of said vacuum pump, and further placing said compressor is in flow communication with said vacuum pump by way of said switchover valve block;

substantially emptying residual content of said refrigerant by said vacuum pump from the refrigerant circulation system of the vehicle air-conditioning system;

conducting through the separator stage by way of the refrigerant compressor in the second servicing phase pumped-out residual gases;

measuring a defined maximum pressure between an output pressure side of said vacuum pump and a suction side of said refrigerant compressor;

temporarily switching off said vacuum pump until a pressure at one of the output side of the vacuum pump or the suction side of the refrigerant compressor reaches an acceptable level; and, determining the quantity of residual refrigerant collected.

* * * * *